Jan. 26, 1932.                M. R. PIERCE                 1,842,837
                         ALTITUDE READING RECORDER
                            Filed Sept. 6, 1928

INVENTOR
MAURICE R. PIERCE
BY Warren S. Orton
ATTORNEY

Patented Jan. 26, 1932

1,842,837

UNITED STATES PATENT OFFICE

MAURICE R. PIERCE, OF LAKEHURST, NEW JERSEY

ALTITUDE READING RECORDER

Application filed September 6, 1928. Serial No. 304,376.

The invention relates to a portable celestial geometric and surveying instrument of the nature of a sextant for making permanent records of observation taken of celestial and other distant bodies.

The primary object of the invention is to provide a single device for accurately ascertaining and recording altitudes, zenith distances and other vertical angles.

Another object of the invention is to provide a form of altitude or zenith distance observing instrument by means of which the observed readings may be photographically recorded at the instant the observation is made, and at the same time to eliminate any necessity of using a camera with the expensive form of lens necessary to photograph distant bodies, especially at night.

Broadly, these objects are attained by securing an inclinometer to a sighting instrument, which need not include a lens system, with the indicator of the inclinometer exposed at proper focal distance from a small inexpensive form of camera preferably of a type which can be repeatedly and rapidly actuated by suitable manual control to insure a sequence of records which can be compared to give an estimated reading substantially free of error in observation. The invention also features the inclusion within the field of the camera of a time indicator, the readings of which can be taken simultaneously with the recording of the inclinometer readings and thus permit of the time corrections usually made in celestial geometry.

Another object of the invention is to provide a single form of device for recording automatically the declination of the sun at any instant of time which is also recorded.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

Figure 1:
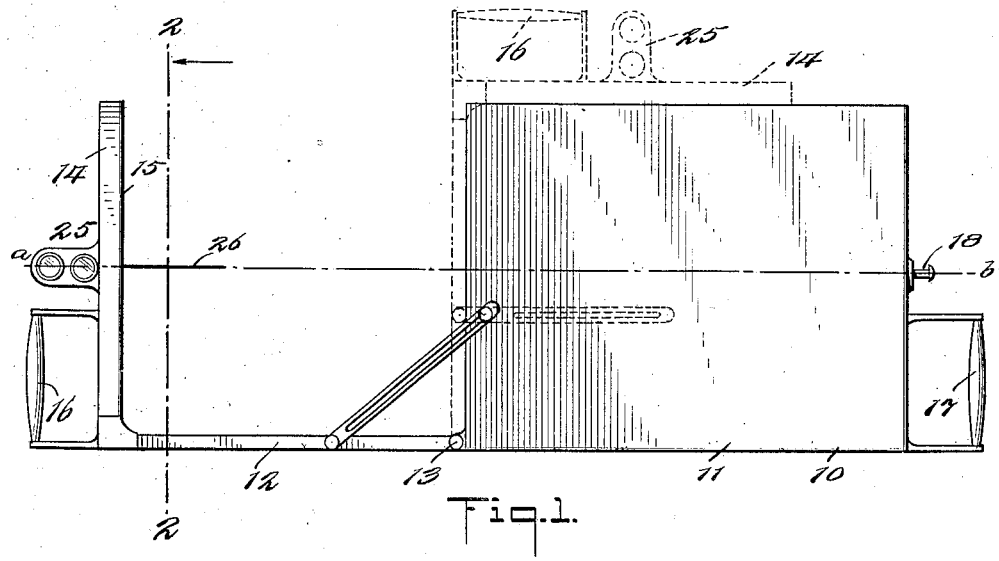
Figure 2:
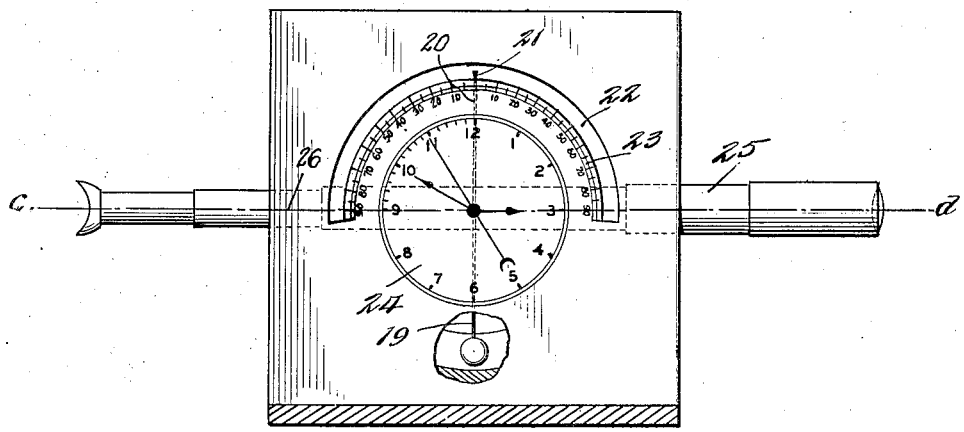

In the accompanying drawings:

Fig. 1 is a view in full lines of a preferred embodiment of the invention with the parts extended into operative position and, in dotted lines, showing the extended parts folded into compact position disposed for easy carrying and storage when the device is not in use, and Fig. 2 is a transverse sectional view taken on the line 2—2 of Fig. 1 looking in the direction indicated by the arrow, and showing the combined screen and instrument board with the instruments carried thereby exposed to the field of the camera.

In the showing in Fig. 1 there is disclosed a camera 10 of conventional design but which preferably is of the type of cameras in which a film is presented for rapidly succeeding snap exposures. As the camera is not intended for use in photographing objects at remote distances and is intended solely for the purpose of photographing the instruments hereinafter defined and which are positioned close to the camera, a small inexpensive form of camera with the usual fixed short focal range may be used. The camera includes a rectangular casing 11 which is provided at its forward end with an L-shaped extension 12 pivotally connected to the camera casing by a hinge 13. The extension includes an upstanding rectangular board 14, referred to hereinafter as a camera screen and as an instrument board, so proportioned and arranged that its inner side 15 facing the camera is at the proper focal distance from the camera to permit of a clear photographing of the board and the parts carried thereby without necessity of focusing the camera. It is understood that the board acts as a screen which limits the field exposed to the camera and prevents the camera from photographing anything but the board and the parts carried thereby. The camera is provided at opposite ends with handles 16 and 17 arranged so that the instrument as a whole may be conveniently held in front of the observer and rotated about its longitudinal axis *a*—*b* hereinafter referred to as the optic axis of the camera. The actuation of the camera is controlled conventionally by control mechanism indicated symbolically by the push button 18 which is arranged in juxtaposition to the handle 17 so that the camera may be caused to function by the hand engaging one of the handles as the instrument is held in position before the eyes of the operator.

In the form of invention illustrated in Fig. 1 the extension is so proportioned and designed that it may be folded to bring the instrument board in position on top of the camera casing and with its exposure face 15 facing downwardly and protected by its engagement with the top of the camera casing 11, as illustrated in dotted lines in Fig. 1. In this folded position the handle 16 provides a convenient means for supporting the instrument as a whole, and any usual fastening means heretofore employed to secure the usual camera bellows in place may be employed to secure the extension in both its extended and collapsed positions.

The instrument board is internally recessed at its center and within the recess is mounted an inclinometer 19. In the instant case, the inclinometer is in the form of a weighted pendulum fulcrumed to swing about the axis $a$—$b$ and provided with a normally upstanding pointer 20 the extreme end 21 of which is exposed to view through an arcuate slot 22 formed in and opening through the instrument board 14. Preferably this end 21 is of a color contrasting vividly with the portion of the board outlining the slot and as the device is intended primarily for night use the exposed end 21 may be made of or painted with some luminous material. It is obviously within the scope of the disclosure to provide other forms of inclinometer and it is suggested that a bubble or mercury level might be used in place of the pendulum illustrated.

The portion of instrument board outlining one side of the slot 22 is provided with a scale having angle graduations 23 so arranged relative to the pointer that when the instrument is in its normal horizontal position, the pointer will register with the zero mark on the scale as indicated by the position of the pointer in Fig. 2. In the instant case the scale is graduated from top to bottom to indicate angles from zero up to ninety degrees of angle measured from a horizontal plane of reference, hereinafter referred to as the horizontal towards the vertical. While the scale illustrated is arranged with its zero indication when the camera is held horizontally it is obviously within the scope of the disclosure to provide other forms of scales registering from some selected plane of reference other than the horizontal. For instance, the scale may be reversed in position and in sequence of angular indications where it is desired to use the instrument to measure zenith distance from a vertical plane of reference.

There is also countersunk into the face of the instrument board a watch 24, chronometer, or other time indicator for permitting the recording on the camera film an exact reading of the time at which the film was exposed.

Secured to the rear side of the instrument board 14 is a sighting means 25 herein shown to be a collimator or telescope adapted to be trained on the distant body the altitude of which is to be recorded. This sighting means is disposed with its line of sight, indicated by the line $c$—$d$, extending at right angles to the optic axis $a$—$b$ of the camera. It is obviously within the scope of the disclosure to form the sighting means in the form of a gun sight without optic lens but preferably an inexpensive form of telescope is used to facilitate the locating of a faintly luminous body, such as a star of secondary magnitude.

Sticking a pin perpendicularly into the side 15 of the instrument board 14 provides a means for recording the angle of declination of the sun. It can be assumed that there is a long pin 26 stuck into the board perpendicular to the plane thereof, in the plane $c$—$d$, for convenience, offset from the time piece 24. If the board is then brought into position in the plane of the sun a shadow will be cast by the pin on the face 15 of the board and this shadow will be photographed when the camera is caused to function. By measuring on the resulting print the angle between the horizontal, i. e., the line $c$—$d$, and the line of the shadow the angle of declination may be read directly, provided, of course, that the instrument is horizontal at the time the camera was snapped. If it should so happen that the instrument was not horizontal at the time, the proper correction in the ascertained angle can be made by adding or subtracting the angle of declination or the angle of ascension indicated by the inclinometer as the case may be.

In operation and assuming that the camera is charged with a suitable film, with the camera shutter closed, and the parts in the operative position shown in the drawings, the operator brings the instrument and board into the vertical plane containing the distant body and at the same time brings the sighting means up to his eyes and trains the eye and objective sights onto the distant body. The objective lens of collimators of the type shown are provided with cross wires to locate the control of the optic field. At the instant the operator finds that the cross wires are centered on the distant body he presses on the camera control button 18. This will cause the camera to take a picture of the position of the inclinometer pointer, in its relation to the scale and of the time piece at the instant the cross wires were on the distant object. It is assumed that the camera may be of the type which can progressively position a new portion of its film in the optic axis following the snapping of each succeeding picture. In order to minimize the error incident to the personal equation, and particularly when taking observations at night, the operator preferably will take several photographs in as rapid succession as possible and whenever the distant body comes within the line of sight of the sighting means. In each instance, of course, there is also photographed the time in which the several exposures were taken, and the time data will permit of the usual correction in taking altitude observations of celestial bodies following conventional practices in this respect. It will be obvious that the mean or average of the several angular readings of the inclinometer as noted on the reproduced print in the subsequent development of the film will give an extremely accurate reading of the observed altitude. After four or five observations have been taken and recorded photographically on the film, it is removed from the camera, developed conventionally and prints taken of the several exposures.

It is also within the scope of the disclosure to use the device illustrated to measure angles of declination, for instance, the spotter in the observation top of a battle ship could train the line of light in a distant target and press the camera actuating butt at the instant the projectile struck the target. For this use, however, the slot 22 and the graduations 23 should be duplicated on the left side of the zero, that is, horizontal indicating position of the pointer as shown in Fig. 1. When both angles of elevation as well as angles of depression are desired, the slot 22 is continued about the part of the board above the clock marks 9 to 12 so as to form the slot to extend for 180° with its ends at the line c—d.

I claim:

1. In a portable device for photographically recording the altitude of a distant body at some definite time, the combination of a camera, including a casing, an extension having two positions, in one with the extension in compact close relation to the camera and in the other in an operative position spaced from the camera, a part of said extension when in said operative position disposed at proper focal distance to be photographed by the camera, said device provided with a handle and said camera provided with a control disposed in juxtaposition to the handle to permit of its being actuated by the hand engaging the handle, a telescope fixed to the extension and adapted to be directed to the distant body and the part of the extension adapted to be photographed provided with an inclinometer and with a time piece.

2. A camera sextant for recording altitudes of distant bodies, at a definite time, comprising a camera provided with an instrument board at fixed focal distance therefrom to photograph the side of th...
the camera, said board cons... limiting the field of the came... provided with handles for rotat... as a whole about its optic axis, ometer and a time piece carried by t... and exposed to the camera to be... graphed thereby, and a telescope havi... optic axis fixed relative to said board, exte... ing at right angles to the optic axis of th... camera and adapted to be directed towards the distant body the altitude of which is to be photographically recorded.

3. In a device for recording photographically the altitude of a distant body, the combination of an instrument board adapted to be disposed approximately in a vertical plane containing the distant body, sighting means secured to the board and adapted to be trained on the distant body, an inclinometer carried by the board and including a movable element and a coacting scale, for indicating the elevating or declination angle of said sighting means, a time indicator carried by said board, a camera operatively disposed to photograph the board and simultaneously photograph both the readings of the time indicator and the movable element in its relation to the scale at the instant the camera functioned.

4. In a device for obtaining the altitude of a distant body, the combination of a sighting means adapted to be trained directly on said body, means for indicating the angle between the horizontal and the line of sight of said sighting means, a time indicator means for photographically recording simultaneously both said angle and the reading of said time indicator and a manually actuated control for causing said last named means to function.

5. In a device of the class described, the combination of a camera provided with an instrument board defining its normal field, an inclinometer carried by said board and exposed and adapted to be photographed by the camera, a telescope associated with the inclinometer to cause the inclinometer to indicate the angle between the optic axis of the telescope and the horizontal, said telescope having its field exterior of the field of the camera and not exposed to the camera.

6. In a device of the class described, the combination of a support provided at one end with a camera, means providing handles at opposite ends of the support for rotating the support and camera about the optic axis of the camera, a screen carried by the support at the end thereof opposite the camera for limiting the field which can be photographed by the camera, an inclinometer and a time indicator both disposed in said field and in proper focal position to be photographed by the camera, thereby to obtain a pictorial record of the readings of both the inclinometer and of the time simultaneously at the instant ...nctions to take the picture of ...dicator and inclinometer.

... device of the class described, the ... of a camera screen adapted to ... a normal position, a telescope ...en to move therewith, an in-...ed by the screen, and includ-...ement and an associated scale ... the angle at which the screen ... a camera focused on said screen and operatively disposed to photographically record the reading of the movable element in its relation to its scale at the time the camera is caused to function.

8. In a device for determining the altitude of a distant body, the combination of a portable support, an inclinometer carried thereby, a camera capable of taking a series of snap pictures in rapid succession of said inclinometer, a manually actuated means for controlling the function of the camera, and sighting means having its line of sight fixed relative to the support and adapted to be directed towards the distant body.

9. In a device for recording the angle of elevation or depression from the horizontal of distant bodies at a definite instant of time, the combination of a support adapted to be rotated in space about a horizontal axis, sight means fixed to and movable with said support, disposed at right angles to said axis and adapted to be trained on the distant body, an instrument board carried by the support and rotated therewith about said axis, means mounted on the board for indicating angular variations of the board from its normal position when the sighting means are horizontally directed, means for indicating time, a camera disposed to photograph the readings of both of said indicating means and a manually actuated control for the camera.

10. In a device for recording the angle of elevation or depression from the horizontal of distant bodies, the combination of a support adapted to be rotated in space about a horizontal axis, sighting means fixed to and movable with said support, disposed at right angles to said axis and adapted to be trained on the distant body, an instrument board carried by the support and rotated therewith about said axis, means mounted on the board for indicating angular variations of the board from its normal position when the sighting means are horizontally directed, a camera disposed to photograph the readings of said indicating means and a manually actuated control for the camera.

11. In a device for indicating the angular variation from the horizontal of a distant body, the combination of a portable support adapted to be rotated about a horizontal axis, sighting means fixed to and movable with the support for viewing the distant body and thus establishing the direction of line from the device to the distant body, means carried by the support for establishing the direction from the device of a horizontal line in the vertical plane containing said distant body, and means for recording photographically the vertical angle between said lines.

12. In a device of the class described, the combination of an instrument board adapted to be disposed in a vertical plane, sighting means rotatable in a vertical plane and adapted to be trained directly on a distant body, means fixed to and movable with the board for indicating the angle between the line of sight through said sighting means and the horizontal and means for photographically recording said angle.

13. In a device of the class described, the combination of a sighting means adapted to be trained on a distant body, an inclinometer for indicating the angle between the line of sight through said sighting means and a geographic line in space selected as a line of reference, a support for the inclinometer fixed to the sighting means and means for photographically recording said inclinometer with it angle indications.

14. In a device of the class described, the combination of an instrument board, adapted to be rotated in space about a horizontal axis, a sighting means fixed to and rotative with the board, said board provided with an arcuate scale graduated in degrees and a coacting pointer for indicating the rotation of the board about said axis, a time indicator positioned within the arc defined by the scale and in close juxtaposition to the scale and a camera focused on the scale and time indicator.

Signed at Lakehurst, in the county of Ocean and State of New Jersey, this 27th day of August, A. D. 1928.

MAURICE R. PIERCE.